Jan. 30, 1945.     S. VERNET     2,368,181

SEALING MEANS

Filed May 23, 1942

INVENTOR
Sergius Vernet
BY
Andrew K. Fouldz
his ATTORNEY

Patented Jan. 30, 1945

2,368,181

UNITED STATES PATENT OFFICE 2,368,181

SEALING MEANS

Sergius Vernet, Yellow Springs, Ohio, assignor to Vernay Patents Company, Yellow Springs, Ohio, a corporation of Delaware Application May 23, 1942, Serial No. 444,178

16 Claims. (Cl. 297—6)

This invention relates to new and useful improvements in fluid operated force transmitting devices and more particularly to means for maintaining an effective pressure seal between the force creating means such as a thermostatic element and a thrust element to be moved thereby such as a plunger or piston.

An object of the invention is to provide an inexpensive sealing means for high pressure and which will permit a relatively long reciprocal travel of the thrust element.

Another object is to provide an effective seal for very small diameter pistons.

Another object is to provide a novel thermostatic device.

Another object is to provide means by which a diaphragm can be utilized with a piston of very small diameter.

Another object is to provide means to increase the lineal movement of the piston relative to the lineal movement of the pressure receiving side of the sealing means.

Another object is to provide a sealing means in which a greater unit area sealing pressure is exerted than the unit area pressure exerted on the sealing means for actuating the piston.

Another object is to provide a sealing means which materially reduces osmosis and which has a very low degree of permeability.

Another object is to make possible the use of a natural or synthetic rubber diaphragm of considerably less thickness than could heretofore be used.

The invention consists in the improved construction and in the novel cooperative relation of parts to be more fully described hereinafter and the novelty of which will be particularly pointed out and distinctly claimed.

In the accompanying drawing, to be taken as a part of this specification, there are fully and clearly illustrated a number of preferred embodiments of the invention, in which drawing—

Figure 1:
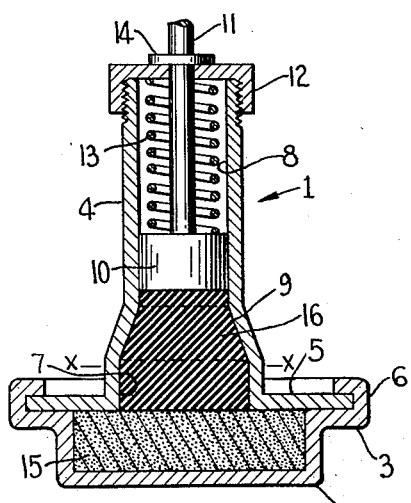
Figure 1 is a greatly enlarged view in longitudinal central section through a thermostatic pressure actuator having a sealing means including the invention.

Referring to the drawing by characters of reference, in Fig. 1, the numeral 1 designates generally a thermostat having a shallow pan-shaped metal casing or container 2 preferably of material having a high heat conductivity, such as brass, and having a surrounding flange or rim 3 on which is mounted a tubular metal housing or supporting member 4. Extending from the bottom open end of member 4, there is a lateral surrounding flange 5 which seats on the rim 3 and is secured and hermetically sealed thereto by an inturned and bent-over flange 6 extending from the rim 3. The housing member 4 has a sealing bore 7 at its lower end which opens upwardly or outwardly from the container 2. Above the sealing bore 7 and in open alined communication therewith, the housing member 4 has a cylindrical guide bore 8. The bore 7 which has a cylindrical portion extending through the flange 5, is of larger diameter than the bore 8 and has at its junction with the bore 8 an annular reduced portion or neck 9 which is in the form of a truncated cone tapering to the bore 8 so that the neck provides a downward facing restricting throat or annular shoulder converging toward the bore 8. Solely by way of example, it may be noted that the diameter of the guide bore 8 may be, say, 0.245 inch, and the diameter of the sealing bore 7 be, say, 0.305 inch, so that the ratio of the areas is greater than one and one-half to one. Within the member 4 there is a cylindrical piston or plunger 10 which slidably fits in the bore 8 and has a thrust rod or operating member 11 extending longitudinally through and from the upper or outer end of the member 4. A cap or cover member 12 is screw-threaded or otherwise secured on the top end of member 4 and has an aperture therethrough, through which the rod 11 extends. Surrounding the rod 11 and held under compression between the piston 10 and the cap member 12 there is a helical coil spring 13 preferably exerting an expansive force of about two hundred pounds per square inch in opposition to movement of the piston. Movement of the piston 10 toward the bore 7 is limited by a stop member 14 carried by the rod 11 and engageable with the cap member 12. The stop member 14 is so positioned that the piston 10 is prevented from movement into the neck or tapering enlargement 9. Within and filling the container 2 there is a temperature responsive element 15, preferably a preformed pellet or body such for example as is disclosed in Patent 2,259,846 dated Oct. 21, 1941, or it may be composed of high molecular weight alkanes or similar substances intimately mixed together with finely divided heat conducting material. One example of such alkanes is a hydrocarbon wax, preferably paraffin which may be defined as a mixture of solid hydrocarbons chiefly of the methane series obtained from petroleum.

As illustrative of a pellet of highly characteristics, the same may comprise from eighty to eighty-two percent by weight of copper powder of say 140 to 160 mesh fines with the remainder of alkanes or other expansible binder material. The quantity of powder is also such that if the cup 2 were filled with the loose powder, the powder would overflow by an amount at least as great as the volume of the sealing bore 7 which the pellet occupies upon full expansion and may be in excess of 150% of the cup volume. The powder and alkanes are compressed to pellet form in a press exerting a pressure of 5000 pounds per square inch or even higher pressures. From this, it will be noted that the expansible material is in extremely thin layers or coatings on and filling the interstices between the powder particles, thereby enhancing the speed of response of the pellet to change of temperature. The material comprising the element or pellet 15 is therefore such that it does not flow freely under any conditions to which it is subjected in use and being a semi-solid or plastic, it requires a definite pressure which may be fifty pounds or more per square inch to compress it from an expanded condition. Although it expands and contracts in the desired temperature range, contraction on temperature decrease may result in voids occurring within and through the element so that unless compressed as it contracts, it will not return to its initial volume, that is, it has an inherent resistance to contraction in volume upon temperature decrease. Filling the sealing bore 7 between the pellet 15 and the piston 10, there is a sealing plug 16 of pliable elastic material, such as Ameripol or vulcanized gum rubber, which has substantially permanent elasticity such that it distorts but does not flow under pressure. The plug 16 which is preformed as a cylinder of slightly larger diameter than the cylindrical portion of the bore 7, is under a high degree of compression between the piston and pellet by the spring 13 and preferably contains a lubricant to aid in bodily sliding movement of the plug. The length of the plug 16 is such that it will not be completely moved out of the bore 7 or through the neck 9 into the bore 8 upon full expansion of the element 15.

The operation of the device of Fig. 1 is as follows: The thrust rod 11 is connected to any device which it is desired to operate such as a valve, a switch or an indicator, for example. When the temperature of the medium to which the container 2 is subjected reaches the desired operating temperature, the pellet 15 will expand and thereby exert a high pressure against the sealing material 16. This high pressure will be sufficient to distort or laterally compress the plug 16 so that it will be extruded or forced through the reduced neck 9 to move the piston 10 upward against the force of the spring 13. Since the plug 16 is not plastic, the pressure moves it bodily with sliding contact on or against the bore walls, so that its lower surface in contact with the pellet is moved upward while retaining substantially its plane surface form, as indicated by the line $x$—$x$. Since the heat transfer material or copper powder will more than fill the space beneath the plug 16, the material is carried up into the sealing bore 7 by the expanding expansible material and no pools or segregated areas of expansible material will occur which otherwise might happen due to change in arrangement of the powder particles and also, no stratification or packing of the powder will take place. Upon temperature decrease, so that the pellet cools and contracts and ultimately hardens, the spring 13 will move the plug 16 downward toward the container 2 and since the plug 16 is elastic and under distorting compression from its inherent shape, the extruded portion will expand to fill the bore 7 as it moves thereinto. Also, due to the friction losses in moving the plug the lateral pressure of the plug against the bore wall will, on downward movement, be greater adjacent the plunger than adjacent the pellet so that the bore will be sealed against travel of the expansible material between the casing and the plug 16. The shallow container 2 which extends radially or laterally outward beyond the member 4 provides for hardening of the pellet 15 radially inward so that downward movement of the piston 10 is not blocked by initial hardening of the pellet at the midportion of the container and beneath the piston. As above noted, the pellet requires external pressure to return it to its initial volume and therefore the pellet does not contract away from the plug 16 which would leave the plug unsupported when the piston 10 had reached its limit of movement. Accordingly, the plug 16 is at all times held under lateral compression in the throat 9 between the piston and the pellet so that the possibility of leakage is eliminated. Since the piston 10 can not pass into the enlarged portion 9, the material of the sealing plug can not flow around the piston lower side edges and thus be forced or drawn, on the next up-stroke of the piston, into the clearance between the piston and the wall of bore 8. Also, the working of the plug 16 as it is changed in cross-section by travel across the neck or zone of pressure 9 serves to prevent setting of the elastic material. The reduction in cross-section by the compacting of the plug at the neck 9 against its resiliency as the plug is forced into the bore 8 provides a tight movable seal, the increase in the plug density reducing the permeability of the rubber and substantially eliminating osmosis. In addition, it is to be noted that due to the elasticity or resilience of the plug 16 which resists its constriction on movement through the converging neck 9, there will be an increase in pressure per square inch on that peripheral portion of the plug which abuts or is under compression against the neck 9 which will be in excess of the actuating pressure per square inch by reason of the work expended in reducing the cross-section of the plug. This increased pressure will be greater per square inch than the pressure per square inch exerted on the plug by the pellet and will therefore provide a zone of sealing pressure which will prevent leakage from occurring past this point or zone, since any medium which might leak and which is under a definite flow pressure obviously can not flow against or in the direction of a higher pressure. Due to the resilience of the plug 16, this increased pressure at the sealing zone will not decrease and equalize to the pressure per square inch exerted by the pellet during periods of rest.

Figure 2:
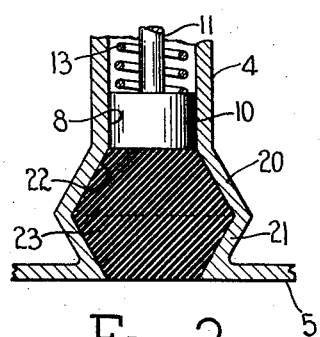
Figs. 2, 3, 4 and 5 are each greatly enlarged detail views in longitudinal central section of other forms of sealing means for pressure actuators.

In Fig. 2, the tubular member 4 has its sealing bore of oppositely directed tapered portions 20, 21 so that they form a diverging-converging throat from the chamber side of the flange 5 to the bore 8. It will be noted that the annular neck or portion 20 provides a downward facing restricting throat or converging annular shoulder at the juncture of the sealing bore 22 and the guide bore 8. The piston 10 is held against movement into the enlarged or diverging bore portion 20 by any suitable stop means, such as that in Fig. 1. The space below the piston 10 is filled to a point beyond the junction of the portions 20, 21 with a sealing plug 23 of the pliable elastic material. The length of the plug is sufficient so that it will not pass out of the bore portion 21 upon complete outward travel of the piston.

Figure 3:
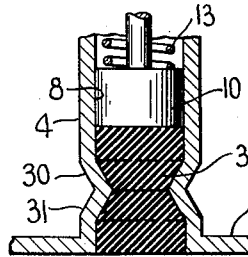

In Fig. 3, the tubular member 4 has its sealing bore formed by converging portions 30, 31 so that they provide in an outward direction a converging-diverging throat leading from a cylindrical bore opening through the chamber side of the flange 5, the outward flaring portion 30 merging into the bore 8. The junction of the portions 30, 31 provides an annular restricting throat or neck. As in Fig. 2, the sealing bore is filled by a pliable elastic sealing plug 32 from the piston 10 to a point beyond the junction of the portions 30, 31 with each other. The length of the plug 32, the piston being held against movement into the portion 30, is such that complete outward piston travel will not permit the lower or chamber end of the plug to pass out of the bore portion 31.

Figure 4:
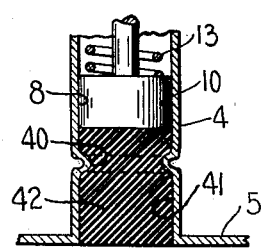

In Fig. 4, the sealing bore has an inturned annular fold or rebent portion 40 at the junction of the sealing bore with the guide bore 8. The fold 40 provides an internal annular throat or reduced portion or neck within the member 4. In this form the neck 40 may serve as a stop to limit movement of the piston 10 under the force of the spring 13. Below the neck 40, the bore of the member 4 is internally substantially cylindrical, as at 41, to its junction with the flange 5. Filling the bore 41 and extending through the neck 40 into engagement with the piston 10, there is a pliable elastic sealing plug 42. As in the preceding forms, the plug 42 is prevented from complete travel through the neck 40.

The operation of the forms of the invention shown in Figs. 2, 3 and 4, it is believed will be obvious from the description of Fig. 1. However, it should be noted that in each of these forms, the sealing plug is compressed laterally upon movement in either direction and by its pliable elasticity serves to maintain the sealing and guide bores transversely filled below the piston as the piston is reciprocated, thereby providing a double compression seal preventing leakage of the pressure fluid or medium through the piston clearance. The plug is at all times under compression so that even though a temperature responsive medium is employed which will contract to original volume without external pressure, the seal will be maintained by the piston return spring acting in Fig. 2 to compress the plug in the zone 21, and in Figs. 3 and 4 to compress the plug in the zone 30 and above the bend 40 respectively.

Figure 5:
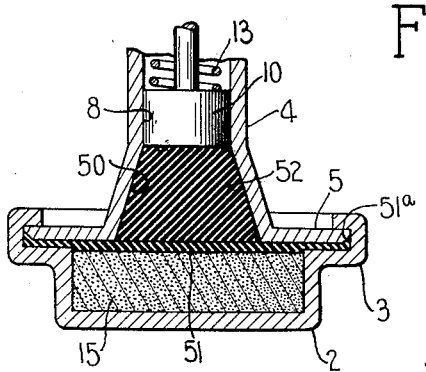
Figure 6:
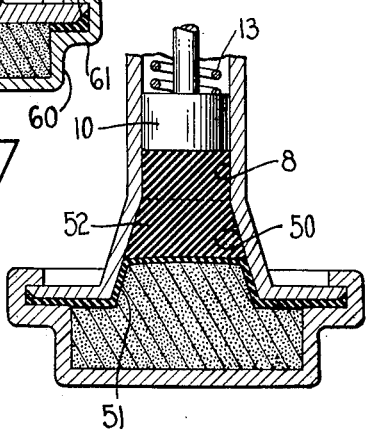
Fig. 6 is a detail view also in longitudinal central section showing an operated position of the actuator of Fig. 5.

Referring to Figs. 5 and 6, a form of the invention is shown in which a diaphragm is employed. Here, the open-ended tubular member 4 has a sealing bore 50 which flares outward from the bore 8 to the flange 5 so as to provide an annular converging reduced portion in the sealing bore at its junction with the guide bore 8. Clamped at its periphery and squeezed or compressed to a reduced thickness between the container rim 3 and the flange 5, is a diaphragm 51 which is of rubber-like material, such as neoprene. The clamping pressure on the diaphragm periphery is such as to force its edge into the annular recess 51ª thereby anchoring this edge. Filling the container 2 and contacting the diaphragm 51, is the temperature responsive material 15. Filling the sealing bore 50 between the diaphragm 51 and the piston 10 is a plug 52 of the pliable elastic sealing material above described which may be preformed to truncated conical shape, as shown in Fig. 5. The plug 52 serves as a backing for the diaphragm, making it possible to use a relatively thin elastic diaphragm which may be in the nature of say ten thousandths of an inch thick and is therefore of considerably less thickness than was heretofore possible. The diaphragm also aids in maintaining the plug 52 in tightly fitting contact with the wall of the sealing bore so that no portion of the diaphragm is unsupported against the operating pressure of the pellet. The plug 52 which is slightly oversize is under lateral compression and distortion and eliminates contact of fluids with the diaphragm, which fluids might otherwise leak through the piston clearance from bore 8 and be deleterious to the diaphragm or tend to penetrate the diaphragm by osmosis. Also, the plug 52 and the complete surface of the diaphragm are both at all times under considerable compression thereby increasing their density and rendering them less permeable so that the possibility of osmotic action through the diaphragm is materially reduced and is substantially overcome through the plug. When the materials of the diaphragm and the expansible material are such that the diaphragm is normally permeable to the expansible material, a small quantity of the expansible material may pass, due to the operating pumping action, through the diaphragm; but any such material which passes through will be retained against escape by the plug and therefore will terminate due to the balance set up on the opposite sides of the diaphragm. Also, the high pressures per square inch to which the diaphragm and the plug are subjected at all times, considerably reduces the deleterious effect resulting from their contact with solvents. When the desired operating temperature, say 140° F. is reached, the pellet 15 will start to undergo its operating expansion or softening, complete at say 160° F., and will move the piston upward say to the position of Fig. 6. The pressure exerted by the pellet will be equal in all directions and will be compressing the diaphragm 51 against the flange 5. Since the diaphragm 51 has its marginal edge portion compressed between the rim 3 and the flange 5, the diaphragm portion directly overlying the pellet 15 between the sealing bore and the rim 3 will provide material to be stretched into the sealing bore against the plug 52 as the plug is formed upward or outward, and tension will not be put on that annular portion of the diaphragm which is clamped between the rim 3 and the flange 5. The diaphragm portion which extends upward into the bore 50 and lies against the side walls thereof serves as an insulator for or heat transfer resistance from the pellet portion which it encases or surrounds. Therefore upon temperature decrease, the pellet extension within the diaphragm cup will cool less rapidly than and have a temperature lag relative to the pellet material in the cup 2, so that a hardened plug of the pellet material will not oppose or exert an excessive resistance to return of the pellet material and of the piston under the force of spring 13 to the position of Fig. 5. Since the pellet 15 requires external force, as by the spring 13, to compress it as the temperature decreases, the pellet will hold the diaphragm tightly against the plug 52, and therefore there will be no shrinkage of the pellet 15 upon further decrease of temperature when the piston 10 reaches its downward or inward limit of travel, with the result that no void will occur between the diaphragm and the plug 52 tending to draw or suck fluid inward around the plug. It will also be noted that the height of the column or pellet extension is reduced for a given movement of the piston by the mechanical leverage or reduction in piston area relative to the opening from the cup 2 which results in decreasing the possibility of the pellet extension hardening prior to hardening of the remainder of the pellet.

It will be apparent that, if desired, the diaphragm of Fig. 5 can be utilized with the sealing means or plug of each of Figs. 1, 2, 3 and 4 and that all of the advantages will accrue.

Figure 7:
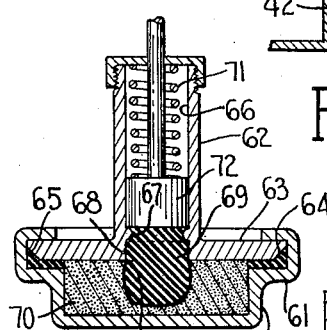
Fig. 7 is a view in longitudinal central section of another form of thermostatic actuator having a different arrangement of sealing means.

In Fig. 7, the cup 60 has a rim 61 which supports the tubular supporting member 62 having an annular flange 63 seating on the rim 61. The flange 63 has a circumferential bevel cooperating with the rim 61 to provide a sealing channel 64 into which a packing material washer 65 of Ameripol or the like is squeezed, by the rim and flange which are tightly clamped together. The guide bore 66 of the member 62 terminates downwardly at a continuous bead or rib 67 below and including which is the sealing bore 68. Filling the sealing bore 68 and laterally distorted by the annular shoulder or throat or reduced portion formed by the bead 67, there is a pliable elastic sealing plug 69 of material such as is above described. Filling the chamber formed by the cup 60 and flange 63, there is the above-described expansible material, designated 70, which surrounds the lower end of the plug 69 and holds the plug under compression against the force of the spring 71. Reciprocally fitting the guide bore 66 there is a piston 72 which seats on the plug 69 and is held thereagainst by the spring 71.

In this form of the invention, when the material 70 is subjected to a temperature in its operating range, it will force the plug 69 upward or outward across the rib 67 to actuate the piston 72. The lateral distortion of the plug 69 as it moves through the zone of lateral distorting pressure will, as above described, prevent any leakage around the plug. It will be noted that the plug although cylindrical when inert is bulged outward to a somewhat barrel shape by external pressure so as to provide a wedging action of the plug in the sealing bore 68 thereby forming a second sealing zone at the inner periphery of the flange 63, as at 73. This bulging of the plug is a distortion caused by the hardening of the material 70 in the bottom of the cup 60 as the temperature affecting the material 70 decreases, i. e. a hardening relative to the rate of hardening of the material 70 at the sides of the plug 69. The radial dimension between the cup side wall and the plug must be greater than the depth of the material in the cup beneath the lower end of the plug in the up-most position of the plug in order to assure a proper heat gradient so that hardening will commence initially beneath the plug to provide effective resistance to downward plug movement to assure the bulging or lateral outward expansion to provide the second seal in the zone 73. This form has the further advantage of reducing the length of the thermostatic actuator relative to that of the other forms of the invention.

Having thus described the invention, what is claimed and desired to be secured by Letters Patent of the United States is:

1. In a force transmitting means, a supporting means having a sealing bore and a plunger guide bore, said sealing bore being of less than twice the diameter of said guide bore and in alined open communication therewith, said sealing bore having an annular shoulder portion, a pliable resilient sealing pulg of elastic material bodily movable in and transversely filling at least a portion of said sealing bore and having at least a portion of its length movable under pressure into said guide bore, the resiliency of said plug being such as to resist the equalization effects of molecular flow sufficiently to prevent equal transmission of pressure to the walls of said sealing bore by said plug during plug movement, said plug portion being laterally resiliently flexed by said shoulder on bodily movement of said plug toward said guide bore, the pressure per unit area of said plug against said shoulder on bodily movement of said plug being greater than the pressure per unit area to move said plug, and a plunger fitting said guide bore and engaged and movable by said plug.

2. In a force transmitting means, a supporting means having a sealing bore and a plunger guide bore in alined open communication with each other, a bodily movable pliable elastic resilient sealing plug of resilient elastic material filling transversely at least a portion of said sealing bore, means to flex a longitudinally changing annular peripheral portion of said plug as said plug is forced bodily toward said guide bore, means to force the annular changing peripheral portion of said plug into cooperative engagement with said flexing means with a force per unit area greater than the unit area actuating force to move said plug, a portion of said plug being movable across said flexing means and into said guide bore by said forcing means, and a plunger abutting and movable by the movement of said plug into said guide bore, said plunger slidably fitting said guide bore.

3. In a force transmitting means, a supporting means having a sealing bore and a plunger guide bore in alined open communication with each other, said sealing bore having at least a portion of its length conical and converging toward said guide bore, a bodily movable pliable resilient sealing plug having at least a portion of its length resiliently flexed and transversely filling at least a longitudinal portion of said conical portion and bodily movable under flexing pressure across said conical portion into said guide bore, said plug having such a consistency as to resist the equalization effects of molecular flow sufficiently to prevent equal transmission of pressure to the walls of said sealing bore by said plug during plug movement, and a plunger fitting said guide bore and engaged and movable by said plug.

4. In a force transmitting means, a supporting means having a sealing bore and a plunger guide bore in alined open communication with each other, said sealing bore having a restricting throat opening into said guide bore, a bodily movable pliable permanently elastic sealing plug of vulcanized material transversely filling a longitudinal portion of said throat and having a portion of full cross-section squeezed under distorting pressure through said throat into said guide bore upon bodily movement of said plug, and a plunger fitting said guide bore and engaged and movable by said plug.

5. In a force transmitting means, a tubular housing member having a plunger guide bore and a sealing more of greater cross-section than said guide bore and in alined open communication therewith, said sealing bore having a shoulder at its junction with said guide bore, a bodily movable solid pliable elastic and cylindrically preformed sealing plug of vulcanized material in said sealing bore, said plug having permanent resilience to hold said plug under permanent lateral distortion across said shoulder upon movement of said plug into said guide bore, a plunger slidably fitting said guide bore and in abutting engagement with said plug, means urging said plunger against said plug and means abutting and operable to urge said plug toward said plunger with a force per unit area on the abutted surface less than the force per unit area of said plug against said shoulder.

6. In a force transmitting means, a tubular housing member having a guide bore and a sealing bore in alined open communication with each other, said sealing bore having an internal converging diverging portion, a pliable elastic sealing plug transversely filling and laterally distorted by said portion and extending into said guide bore, a plunger slidably fitting said guide bore and abutting said plug, and means holding said plunger against said plug.

7. In a force transmitting means, a tubular housing member having an inwardly rebent annular portion, a plunger reciprocally fitting within said housing member, and a pliable elastic sealing plug fitting within said housing member and abutting said plunger, said plug extending across and being transversely distorted by said rebent portion.

8. In a force transmitting means, a supporting means having a sealing bore and a plunger guide bore in alined open communication with each other, said sealing bore having a lateral surrounding flange at its end opposite said guide bore and having an internal portion, converging toward said guide bore an elastic diaphragm closing said sealing bore and overlying said flange, a vulcanized elastic plug transversely filling said sealing bore, means spaced laterally outward from said sealing bore and compressing against said flange a continuous edge portion of said diaphragm to provide inward of said edge portion an excess diaphragm thickness, said plug and said flange inward of and spaced inward from said compressing means supporting said diaphragm against fluid pressure, said plug providing a substantially plane surface continually supporting said diaphragm, and a plunger fitting said guide bore and engaged and movable by said plug.

9. In a force transmitting means, a supporting means having a sealing bore and a plunger guide bore in alined open communication with each other, said sealing bore having a conical portion tapering to said guide bore, an elastic plug having a pressure receiving surface and transversely filling said sealing bore and movable under distorting pressure into said guide bore, said pressure receiving surface maintaining substantially a fixed configuration throughout movement of said plug, a plunger fitting said guide bore and engaged and movable by said plug, means to limit said plunger against movement into said conical portion so that said sealing plug is kept from contact with the side wall of said plunger, and a thin elastic diaphragm closing said sealing bore and supported by said pressure receiving surface so that said diaphragm is reinforced against the distorting pressure acting thereon to move said plunger.

10. In a temperature responsive force transmitting means, a chambered element, a supporting means extending from said element and having a sealing bore and a plunger guide bore in alined open communication, a temperature responsive medium inherently resisting contraction in volume upon temperature decrease and filling said element, said sealing bore having an annular reduced portion, a vulcanized elastic sealing plug transversely filling said reduced portion and supported by said medium for bodily sliding movement in said sealing bore, a plunger fitting said guide bore and supported on said plug, and means acting through said plunger to compress said medium upon temperature decrease and acting to move bodily said plug and to hold said plug continually under compression against said reduced portion.

11. In a temperature responsive force transmitting means, a chambered element, a supporting means extending from said element and having a sealing bore and a plunger guide bore in alined open communication, a temperature responsive medium filling said element, said medium changing in hardness upon temperature change and hardening upon temperature decrease, said sealing bore having an annular reduced portion, a vulcanized elastic sealing plug cylindrically preformed and transversely filling said reduced portion and supported by said medium for bodily sliding movement, an elastic diaphragm closing said chambered element and interposed between said plug and said medium, said diaphragm having a portion encasing a portion of said medium and abutting the wall of said sealing bore upon expansion of said medium so that said encased portion is insulated upon temperature decrease, a plunger fitting said guide bore and supported on said plug, and means acting through said plunger to reduce the volume of said medium upon temperature decrease and acting to hold said plug continually under compression against said reduced portion.

12. A thermostatic actuator, comprising a hollow casing, a tubular supporting member extending from said casing, means forming a reduced annular portion providing a zone of pressure in said supporting member, a pliable elastic plug of vulcanized material in said supporting member and laterally distorted by said means, said plug extending into said casing, a piston reciprocally fitting in said supporting member and supported on said plug, means urging said piston against said plug, and a plastic expansible material filling said casing around said plug.

13. A thermostatic actuator, comprising a hollow casing, a tubular supporting member extending from said casing, means in said supporting member forming a reduced annular portion providing a zone of pressure, a pliable elastic plug of preformed vulcanized material positioned in said supporting member and laterally distorted by said means, said plug extending into said casing, a piston reciprocally fitting in said supporting member and supported on said plug, means urging said piston against said plug, and a plastic expansible material filling said casing around said plug, the radial thickness of the expansible material surrounding said plug being greater than the depth of the expansible material beneath said plug so that hardening of the expansible material will on temperature decrease commence initially beneath said plug.

14. In a temperature responsive force transmitting means, a chambered element, a supporting means extending from said element and having a guide bore and a sealing bore in alined open communication, a temperature responsive medium having an inherent resistance to contraction in volume upon a given temperature decrease and filling said element, a bodily slidable elastic sealing plug of vulcanized material transversely filling said sealing bore and supported by said medium for movement into said guide bore, means to laterally compress said plug, to seal effectively the bore passageway to said element guide bore and seating on said plug, said responsive medium being operable upon temperature increase to force said plug into said guide bore, and means acting through said plunger to compress said medium upon said given temperature decrease and acting to hold said plug continually under compression against said lateral compressing means.

15. In a force transmitting means, a tubular supporting member, means forming a restricted annular area in said member, a bodily slidable elastic semi-rigid plug of vulcanized material in said member and laterally distorted by said means, a piston reciprocally fitting in said member and seating on said plug, and means operable to force an originally full cross-section portion of said plug through said area thereby to move said piston, said plug exerting a greater force per unit area against said area-forming means than the force per unit area exerted by said operable means so that said tubular member is sealed against flow of fluid at pressures per unit area as great as the force per unit area of said operable means.

16. In a force transmitting means, a tubular supporting member, a bodily slidable elastic plug of vulcanized material in said member, a piston reciprocally fitting in said member and seating on said plug, means operable to exert an actuating pressure on and to bodily slide said plug to move said piston, means acting on said piston to oppose said operable means and operable through said piston to slide bodily said plug, and means creating a greater pressure against the periphery of said plug than said operable means or said acting means so that the bore of said tubular member is sealed against fluid flow at said actuating pressure and at the force of said acting means.

SERGIUS VERNET.